US006976259B1

(12) United States Patent
Dutta et al.

(10) Patent No.: US 6,976,259 B1
(45) Date of Patent: Dec. 13, 2005

(54) METHOD FOR ABSTRACT STATE TRANSITIONS WITHOUT REQUIRING STATE MACHINE KNOWLEDGE

(75) Inventors: Tanmoy Dutta, Redmond, WA (US); Jeremy Mazner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 09/677,443

(22) Filed: Sep. 29, 2000

(51) Int. Cl.[7] .......................................... G06F 15/163
(52) U.S. Cl. ....................................................... 719/310
(58) Field of Search ........................ 709/316; 719/310

(56) References Cited

U.S. PATENT DOCUMENTS

| | | | | |
|---|---|---|---|---|
| 5,390,328 A | * | 2/1995 | Frey et al. .................. | 709/315 |
| 5,826,242 A | * | 10/1998 | Montulli ...................... | 705/27 |
| 5,930,792 A | * | 7/1999 | Polcyn .......................... | 707/9 |
| 6,182,092 B1 | * | 1/2001 | Francis et al. ............... | 715/513 |
| 6,418,464 B1 | * | 7/2002 | Minow ......................... | 709/203 |

OTHER PUBLICATIONS

The State Pattern, Pattern Depot, Aug. 1999, pp. 1-8.*
State transitition control procedure for connection www browser an server in internet- involves searching transition path to attain target condition, based on which transition of controlled object is controlled, Derwent information LTD, Aug. 1999.*
Kato, Nagatoshi, Method and device for expanding WWW Browser function, 1997.*

* cited by examiner

Primary Examiner—Meng-Al T. An
Assistant Examiner—LeChi Truong
(74) Attorney, Agent, or Firm—Woodcock Washburn LLP

(57) ABSTRACT

A system and method employ a client-server architecture that abstracts from the client the states of objects and transitions between the states. As a result, the server maintains objects, along with associated states, and state transitions that are provided to clients on demand. The client is only provided with a set of valid transitions between states that are based on the current state of the object and valid transitions out of that state. The states may be additionally filtered based on the permissions granted to the client. In this way, the client is relieved of prior knowledge of valid object states and state transitions. Hence, in a document management system, for example, new states and transitions for objects may be added at the server and propagated through to the clients.

8 Claims, 5 Drawing Sheets

METHOD FOR ABSTRACT STATE TRANSITIONS WITHOUT REQUIRING STATE MACHINE KNOWLEDGE

TECHNICAL FIELD

The present invention relates generally to systems and methods for abstracting from a client the state transitions of an object on a server. More particularly, the invention is directed to abstracting from various clients the states of an object in a knowledge management system so that the actions that the client can perform on the object are dynamically determined.

BACKGROUND OF THE INVENTION

As the amount of information stored by computer systems continues its exponential growth, companies are developing sophisticated information organization methods to aid users in both the storage and retrieval of that information. The ability to capture information, knowledge, and data has created a demand on organizations to absorb and analyze this information, knowledge, and data in a focused way. Organizations and people within organizations that effectively harness this information, knowledge, and data have a competitive advantage.

The onslaught of information has in turn changed the way in which people within organizations interact with information and collaborate in the preparation of projects. For example, the ability for people within organizations to collaborate on the preparation and review of a document has changed the way people interact allowing people to gain knowledge from their experiences and their peers' expertise. The need for effective collaboration in the preparation of documents has become essential to completion of projects. Lack of effective collaboration affects an organization's ability to meet time-to-market constraints, affects bottom line costs, and minimizes top line profitability. To achieve effective collaboration, the collaborative environment must be optimized, information feeds must be integrated wherever possible, and the right tools must be available to visualize and disseminate information rapidly and meaningfully.

Client-server environments facilitate collaboration by providing a central repository of information by way of a server that can provide a common platform for people to interact with by way of client computers. Client-server systems allow a centralized server to uniformly control aspects of the client interaction with programs and data on the server. One such example system is a document management system that provides a mechanism whereby multiple clients can collaborate in development of documents and other objects. Typically, such systems maintain objects in a central location (i.e. on a server) and control the access to the object by multiple clients. In this way, collaboration can be coordinated so that multiple clients are not simultaneously changing the object. For example, clients can access the server and "check-out" an object. Thereafter, other clients attempting to access the object will be notified that that object is in a "checked-out" state and may be prohibited from changing the object. Additionally, clients may see other object states such as "checked-in", "expired", and so on. While the server typically maintains control over the object, access to the object is typically provided by client software. Controlling the functionality of access to the object at the server would provide uniformity across clients and provide for a more flexible system design. Hence, there is a need to provide an improved system and method for controlling the access to and the manipulation of objects in a client-server environment wherein a plurality of clients have varying access to a plurality of objects stored on the server.

SUMMARY OF THE INVENTION

To meet the above need, the present invention provides a flexible, server based system for controlling the operations on objects (i.e., the manner in which users can access and manipulate objects), particularly in a document management system. This functionality is achieved by providing a server-based state-transition model for objects in its domain. The state transition model maintains at the server allowable states for object and allowable transitions between the states. Based on that state transition model, the server can determine what operations are permitted to be performed on a given object to transition the object from its current state to a new state. Whenever a client desires to perform operations upon the object, the client makes a request to the server for currently permitted operations. In this way, clients are divorced from the complexity of the system (e.g., the document management system) and the operations that are permitted to transition a given object to a different state. This use of a state transition model provides among other advantages, uniformity of interfaces, faster system upgrades, and so on.

The system comprises a server that maintains an object or objects to be accessed by a client. The server maintains a set of states and state transitions for each object and maintains a current state of each object. When the server receives a request for an object from a client computer, the server provides to the client the object, the current state of the object, and selected state transitions. The selected state transitions are based on the current state. Thereafter, the client may only perform the state transitions to the object based on said selected state transitions provided by the server.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Figure 1:
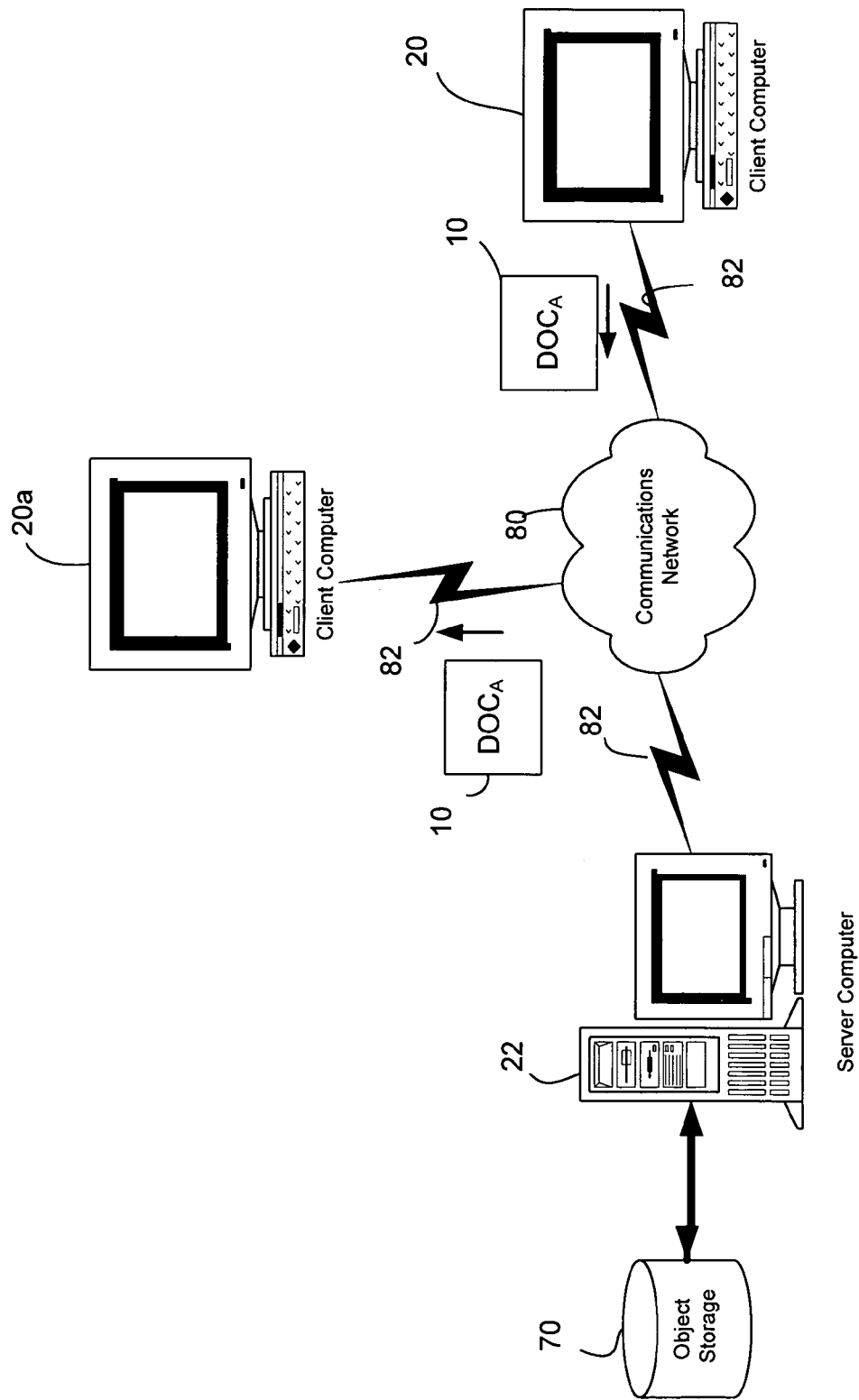
FIG. 1 is a schematic diagram representing a network computer model in which aspects of the present invention may be incorporated.

The present invention addresses the need for a system and method for managing collaborative access to objects. To that end, the system and method provide centralized control over objects and provide a platform wherein actions to be performed on an object are based on the current state of the object and valid transitions from those states. The valid states are maintained on a per-object basis and can be controlled based on the permissions granted to the user.

Exemplary Operating Environment

The present invention is preferably deployed in a network environment, particularly where that network is an Internet or Intranet environment. The term "Internet" is an abbreviation for "Internetwork," and refers commonly to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the non-textual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well, as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client-server architecture. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client-server architecture, particularly a networked system, a client is usually a computer that accesses shared network resources provided by another computer (i.e., a server).

A request by a user for, by way of example, objects such as graphics, video, text and so on, can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (www) or, simply, the "Web," includes those servers adhering to this standard (i.e., HTTP) which are accessible to clients via a computer or data-processing system network address such as a Uniform Resource Locator (URL). The network address can be referred to as a Universal Resource Locator address. For example, communication can be provided over a communications medium. In particular, the client and server may be coupled to one another via TCP/IP connections for high-capacity communication. Active within the client is a first process, known as a "browser," which establishes the connection with the server and presents information to the user. The server itself executes corresponding server software that presents information to the client in the form of HTTP responses. Of course, applications other than browser may operate on a client and communicate with the server using HTTP. However, browser are one example of a common application that communicates using HTTP. The HTTP responses correspond to "web pages" constructed from a Hypertext Markup Language (HTML), or other server-generated data. Each web page can also be referred to simply as a "page."

The client typically displays the information provided through the network by the server, using a software application known as a browser. Most browsers have modern graphical user interfaces that are capable of displaying and manipulating various types of data. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., typically with a URL). The URL address has two basic components, the protocol to be used and the object pathname. For example, the URL address, "http://www.uspto.gov" (i.e., home page for the U.S. Patent and Trademark Office), specifies a protocol of HTTP and a pathname of the server ("www.uspto.gov"). The server name is associated with one or more equivalent TCP/IP address.

FIG. 1 illustrates an exemplary environment in which the present invention may be employed. Of course, actual environments can be arranged in a variety of configurations; however, the environment is shown here in the context of a client server system to provide a framework for understanding the type of environment in which the present invention operates. The system may include client computers 20, 20a, which could be personal computers, thin clients, hand-held computing devices, and so on. Additionally, the system may include a server computer 22, and storage 70, which is coupled to and controlled by server computer 22. The client and server computers communicate with each other by way of communications network 80, which may be a LAN, a WAN, intranet, the Internet, etc.

Client computers 20, 20a and server computer 22 are connected to communications network 80 by way of communications interfaces 82. Communications interfaces 82 can be any one of the well-known communications interfaces such as Ethernet connections, modem connections, DSL connections and so on. Communications interfaces 82 may also be by way of an intermediate communications network such as a LAN.

According to aspects of the present invention, users of client computers 20, 20a may generate and manipulate objects 10 (e.g., DOC$_A$) that must be stored for later retrieval for editing, viewing, and the like. The generic term user(s) is used herein to designate all users of the system; however, in practice user may be distinguished into different classes depending on his or her particular use. For example, a user may be a producer of documents (i.e., an author/editor/creator), a consumer (i.e. a reader trying to find particular documents), or both. Each user may have a different set of operations that they are authorized to perform on document 10. As used herein, the term object refers to any file that contains data and may contain text, graphics, special codes, or a combination of some or all of these. To facilitate object management, the objects generated by client computers 20, 20a are stored in object storage 70 and are thus transmitted to server computer 22 over communications network 80. Server computer 22 then determines the proper storage of the objects in object storage 70.

In addition to the generation of objects, users of client computers 20, 20a may also desire to share objects with other users, e.g., to collaborate on the object development. In order to retrieve objects generated by other users, users make requests to server computer 22 for documents stored in object storage 70. Server computer 22 then retrieves the requested documents and transmits them back to the requesting user's client computer 20, 20a by way of communications network 80.

Figure 2:
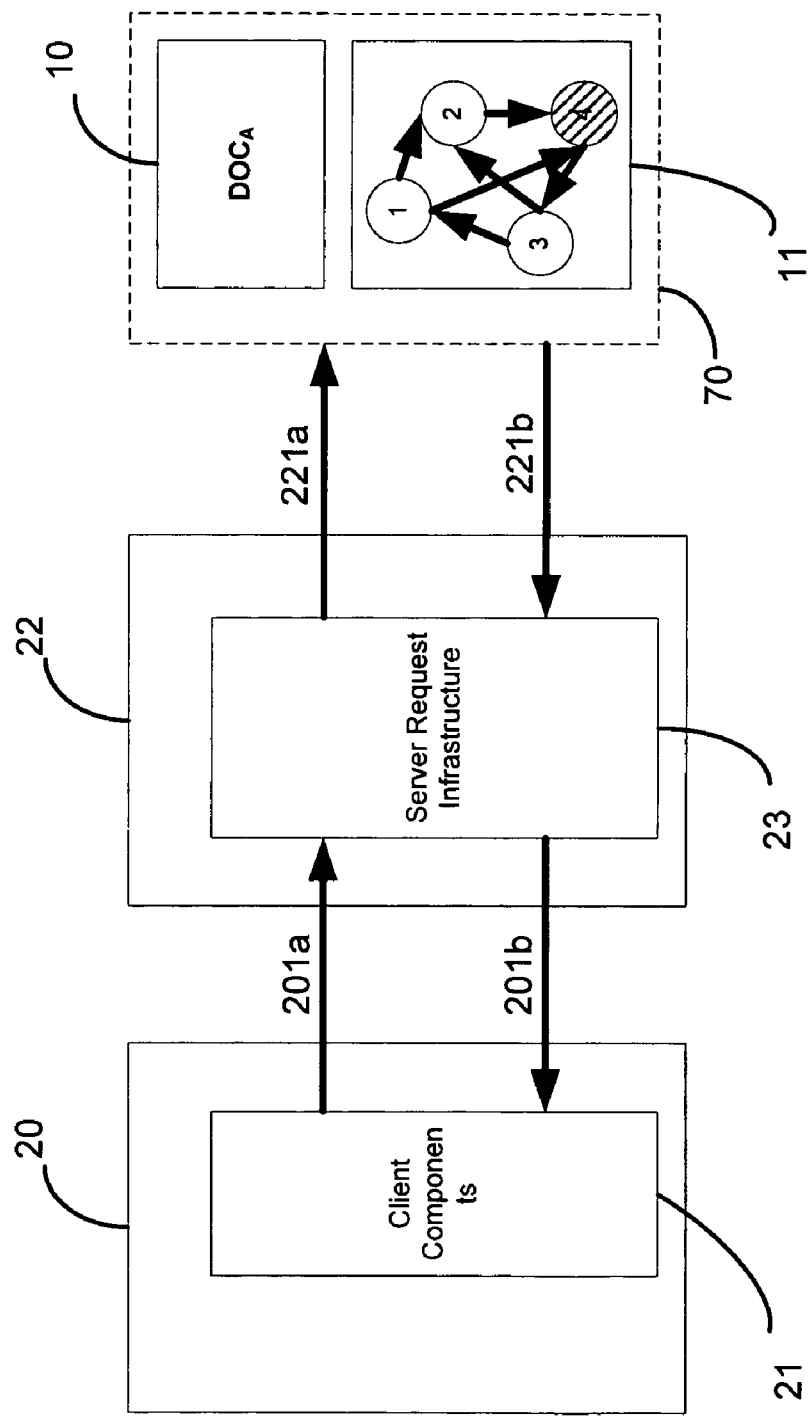
FIG. 2 is an illustration of the storage and retrieval of objects and state information in accordance with the invention.

Server 22 maintains objects and information necessary to control access to the object in object storage 70. FIG. 2 illustrates how client 20 interacts with the server 22 to access and manipulate an object 10. When a user of client computer 20 desires access to an object (e.g., DOC$_A$) client components 21 make a request 201a to server 22. Server 22 has a request infrastructure component 23 that accepts the request and retrieves (221a, 221b) the appropriate object 10 and/or object information 11 from object storage 70. Notably, the object information 11 comprises state information related to the potential states of the object (e.g., state 1, state 2, state 3, state 4), the current state of the object (e.g., shown here as cross-hatched state 4), and the possible state transitions (e.g., transition from state 4 to state 3). Some or all of this information 11 is transferred (201b) in connection with object 10 by server request infrastructure 23 back to client components 21 where the information can be conveyed to give a user appropriate allowed actions on object 10.

According to an aspect of the invention, the operations that a given client 20, 20a may perform on object 10 are dictated by the information 11 associated with object 10, in conjunction with the client's security permissions. Thus, for example, in the illustrative example of FIG. 2 wherein the object 10 is in state 4, the object may only transition to state 3 as indicated by the state transition to state 3 from state 4 and the lack of any other transitions out of state 4. Furthermore, this transition to state 3 may only be allowed for a certain set of clients. By maintaining the information 11 by server 22, any modifications to the information 11, such as the state model associated with object 10, can be made by way of server 22 and dynamically delivered to client 20. In this way, the system is more flexible in that changes made in a central location (e.g. object store 70) are replicated to a plurality of clients. Moreover, client 20 does not need to understand in advance all of the allowed states and state transitions for a given object 10 (which may differ for different objects and different users) but rather obtains the information as needed for each object.

Figure 3:
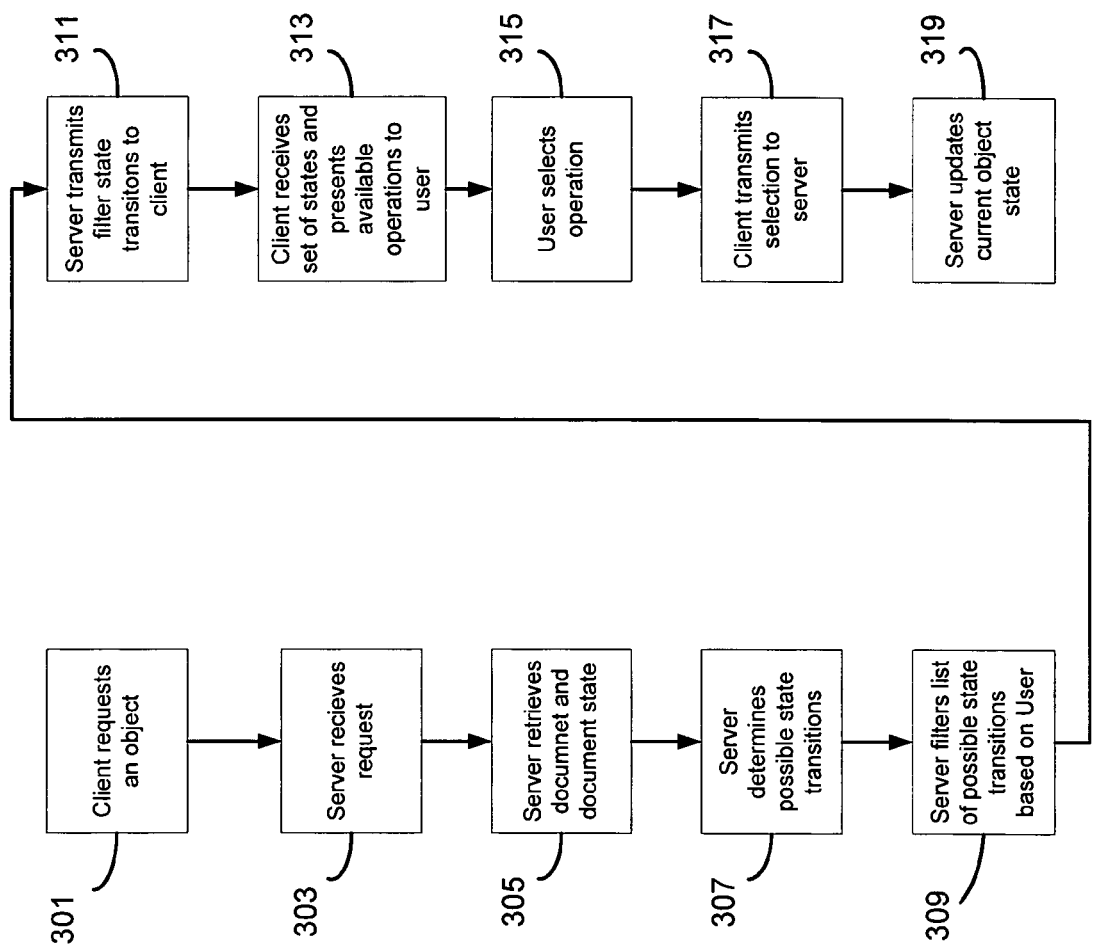
FIG. 3 is a flowchart illustrating the flow of control in client access to objects maintained by the server in accordance with the present invention.
Figure 4:
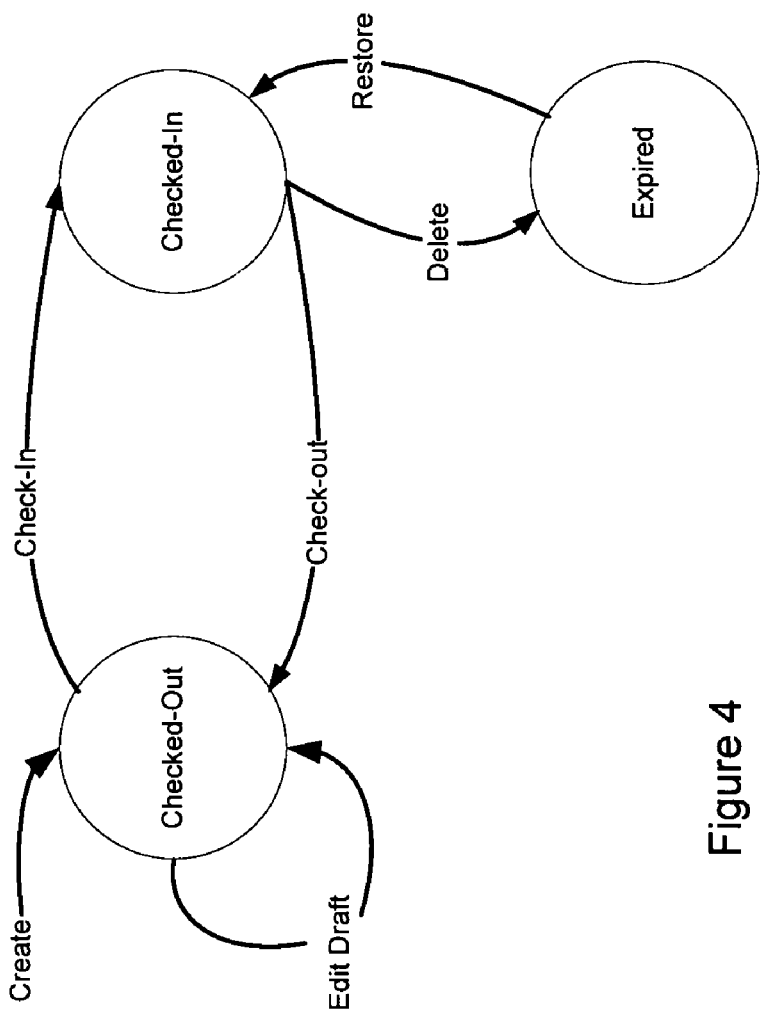
FIG. 4 is an exemplary state diagram that illustrates the transitions of a document between states in accordance with an aspect of the invention.

FIG. 3 is a flow chart that provides further detail of the process performed by client components 21 in conjunction with server request infrastructure 23 whereby client 20 accesses an object 10 and its related information (refer also to FIG. 2). Initially, a user makes a request for an object by way of a client computer 20. That request is processed by client component 21 (301). An exemplary format for carrying out the request would be, in the case of a request for DOC$_A$, for client 20 to send a command to server 22 of the format INVOKE DOC$_A$<operation>GetOpsAllowed</operation>. This request is received by server request infrastructure 23 (303). In response, server request infrastructure 23 retrieves DOC$_A$ from object storage 70 to determine the current state (305). The server request additionally retrieves the current set of state transitions for the object (307). For example, FIG. 4 illustrates an exemplary state transition diagram for a document management system. Using the example of state transitions of FIG. 4, the set of valid state transitions could be stored in a table of the form:

TABLE 1

Sample State Transitions

| From State | To State | Operation (Transition) Name | Credential |
|---|---|---|---|
| None | Checked-Out | Create | All |
| Checked Out | Checked-In | Check-In | Group A |
| Checked-In | Checked-Out | Check-Out | All |
| Checked-In | Expired | Delete | Group B |
| Expired | Checked-In | Restore | Group B |

From the set of all possible valid transitions, the presently valid transitions can be determined based on the current state. Thus for example, if DOC$_A$ is currently in a "Checked-In" state, the possible valid state transitions and thus operations are "Check-Out" and "Delete." Hence, this set of states could be returned to the user. However, in accordance with an aspect of the invention, the set of valid operations could be further filtered based on the user's credentials. For example, it may be the case that all users are not permitted to perform a "Delete" operation. Accordingly, the users credentials are examined and compared to the Credential required to perform the operation. So in the present example in order to perform the operation of "Delete," the user must have a credential available to users in Group B; whereas all users may merely "Check-Out" $DOC_A$ (309).

In accordance with another aspect of the invention, by storing the possible state transitions centrally, the operation (transition) name may be easily converted to a localized name. By merely examining the users language parameter, the operation name may be converted by the server before returning the operation name to the user. This ensures that the server always returned the allowed operations in the language of the client user.

After determining the set of valid operations, the server request infrastructure 23 returns the set of filtered operations to client components 21 (311). Continuing with the document management example, where $DOC_A$ is in a "Checked-In" state, in an exemplary embodiment the set of filtered operations returned to client components 21 may take the form of:

<Ops Allowed>
<Value>Check-Out</Value>
<Value>Delete</Value>
</Ops Allowed>

Figure 5:
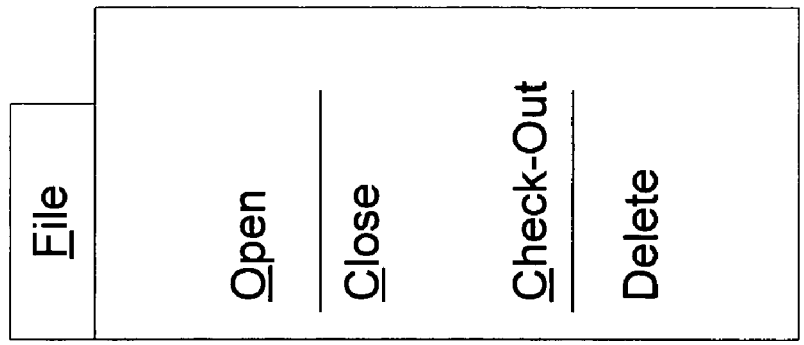
FIG. 5 is an illustration of the modification of a drop-down box to include allowed operations on an object in accordance with an aspect of the invention.

When client components 21 receives the set of operations allowed, the operations are presented to the user (313). This is the essence of the invention—at this point, the client requires no local logic for determining what operations are allowed. FIG. 5 shows how a "File" drop-down box would display the available operations. If, for example, the user selected "Check-Out," the client components 21 would then transmit the selection back to server request infrastructure 23 (315). In an exemplary embodiment, the request would take the form of: TNVOKE $DOC_A$ <operation>Check-Out</operation>. Server request infrastructure 23 would then update the current state of $DOC_A$.

Along with the list of operations, the server can optionally send back a template of the HTTP invoke command to the client. The client processing then would simply reduce to:
Receiving the choice of operation from the client;
Displaying the necessary user interface to fill-in the template received from the server;
Sending the filled out request to the server.

In this way, the client can be made agnostic of the functionality of the server.

Figure 6:
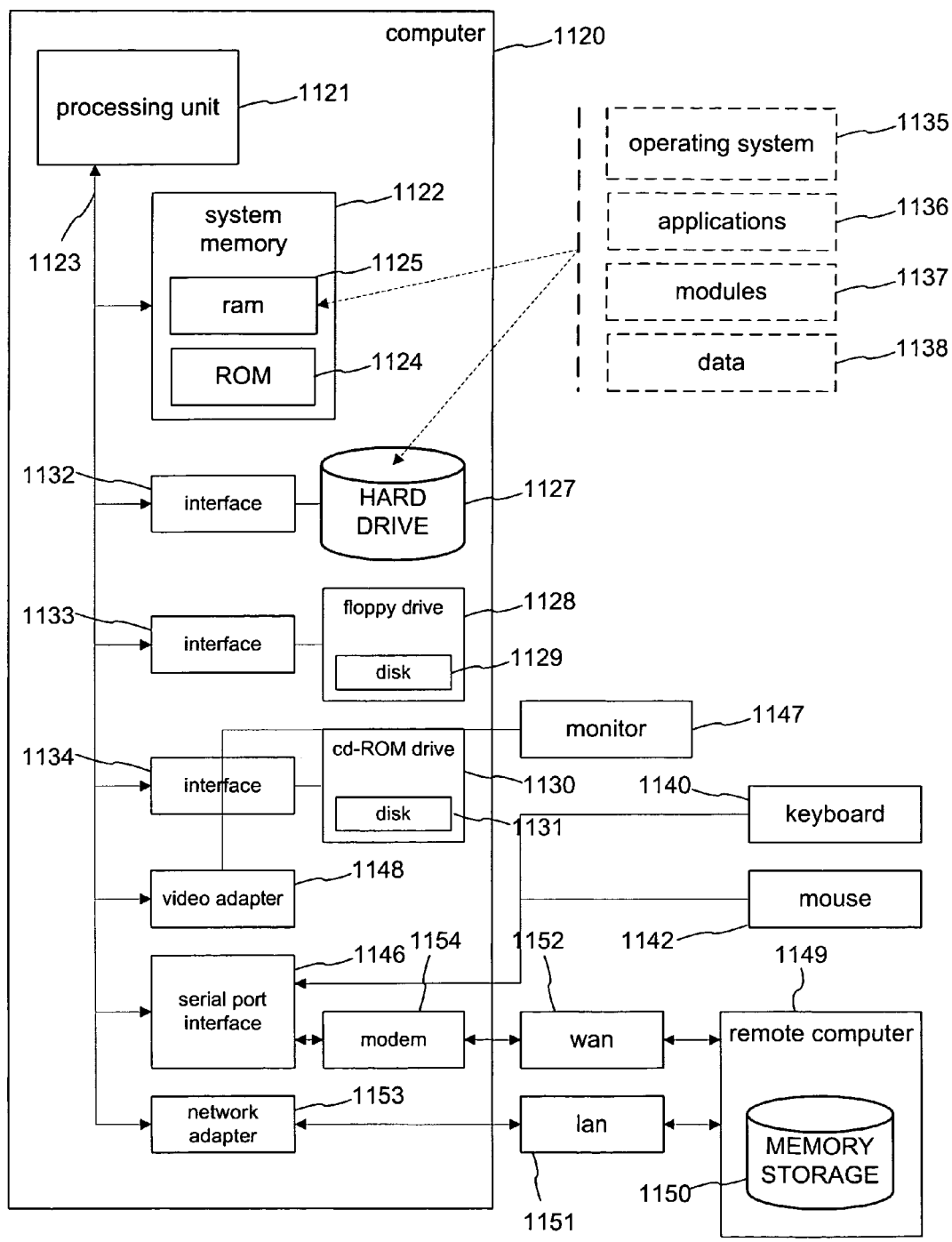
FIG. 6 is an illustrative computer system on which the software and methods of the present invention may be executed.

FIG. 6 illustrates an exemplary computing environment in which the program code that embodies the methods or system of the present invention may be executed. Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program code and program modules comprising program code may be located in both local and remote memory storage devices.

With reference to FIG. 6, an exemplary system for implementing the invention includes a general purpose computing device in the form of a conventional computer 1120, including a processing unit 1121, a system memory 1122, and a system bus 1123 that couples various system components including the system memory to the processing unit 1121. The system bus 1123 may be any of several types of bus structures including a memory bus or memory controller, a peripheral bus, and a local bus using any of a variety of bus architectures. The system memory includes read only memory (ROM) 1124 and random access memory (RAM) 1125. A basic input/output system 1126 (BIOS), containing the basic routines that helps to transfer information between elements within the computer 1120, such as during start-up, is stored in ROM 1124. The computer 1120 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of computer readable instructions, data structures, program modules and other data for the computer 1120. Although the exemplary environment described herein employs a hard disk, a removable magnetic disk 1129 and a removable optical disk 1131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 1129, optical disk 1131, ROM 1124 or RAM 1125, including an operating system 1135, one or more application programs 1136, other program modules 1137, and program data 1138. A user may enter commands and information into the computer 1120 through input devices such as a keyboard 1140 and pointing device 1142. Other input devices (not shown) may include a microphone, joystick, game pad, satellite dish, scanner, or the like. These and other input devices are often connected to the processing unit 1121 through a serial port interface 1146 that is coupled to the system bus, but may be connected by other interfaces, such as a parallel port, game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 may operate in a networked environment using logical connections to one or more remote computers, such as a remote computer 1149. The remote computer 1149 may be another computer, a server, a router, a network PC, a peer device or other common network node, and typically includes many or all of the elements described above relative to the computer 1120, although only a memory storage device 1150 has been illustrated in FIG. 6. The logical connections depicted in FIG. 6 include a local area network (LAN) 1151 and a wide area network (WAN) 1152. Such networking environments are commonplace in offices, enterprise-wide computer networks, intranets and the Internet.

When used in a LAN networking environment, the computer 1120 is connected to the local network 1151 through a network interface or adapter 1153. When used in a WAN networking environment, the computer 1120 typically includes a modem 1154 or other means for establishing communications over the wide area network 1152, such as the Internet. The modem 1154, which may be internal or external, is connected to the system bus 1123 via the serial port interface 1146. In a networked environment, program modules depicted relative to the computer 1120, or portions thereof, may be stored in the remote memory storage device. It will be appreciated that the network connections shown are exemplary and other means of establishing a communications link between the computers may be used.

While the invention is susceptible to various modifications and alternative constructions, certain illustrated embodiments have been shown in the drawings and accompanying detailed description. It should be understood, however, that there is no intention to limit the invention to the specific constructions disclosed herein. For example, while the primary example used throughout was described in connection with a document management system, the present invention is by no means limited to such a system, but could be useful in any system wherein textual, graphic, or other information is managed. Indeed, any system which can be modeled as a finite state machine that requires interaction from remote clients to transition from one state to another in that state machine, would benefit from the invention. As such, the invention is intended to cover all modifications, alternative constructions, and equivalents falling within the scope and spirit of the invention.

What is claimed is:

1. An object management system comprising a computer system:
   a data structure for at least one object in a set of objects in said object management system, comprising for said at least one object a set of object states in which said object may be maintained, a set of transitions between object states, and a current object state;
   computer-readable server instructions that receive requests from a client for said object and computer-readable server instructions that retrieve from said data structure at least a subset of transitions between object states, where said subset of transitions to at least another state is based upon transitions out of the current object state;
   computer-readable server instructions that return to said client an indication of at least the subset of transitions between object states; and
   a set of computer-readable instructions residing on a client, said computer-readable instructions requesting from said computer-readable server instructions a subset of state transitions for the at least one object, receiving in return the subset of state transitions, and presenting a user with operations capable of being performed on said object where the operations are based on the subset of state transitions.

2. The object management system as recited in claim 1 further comprising computer-readable server instructions capable of changing the data structure to change the current state of the at least one object to a selected state of the states in the set of states where the selected state is based on a transition between states contained in the subset of transitions returned to the client.

3. The object management system as recited in claim 1 wherein the objects comprises documents.

4. The object management system as recited in claim 1 wherein the recited computer-readable instructions reside on a server accessible by way of a network.

5. The object management system as recited in claim 4 wherein the network comprises an Internet.

6. The system of claim 1 wherein the indication of the subset states transitions are transmitted as operations that may be performed upon the object.

7. The system of claim 6 wherein the indication of the operations are presented in accordance with a local language of the requester.

8. The system as recited in claim 1 wherein the set of states are maintained in a table of states and associated valid state transitions that are associated with the object.

* * * * *

UNITED STATES PATENT AND TRADEMARK OFFICE
CERTIFICATE OF CORRECTION

PATENT NO. : 6,976,259 B1　　　　　　　　　　　　　　　　　　　　　　　　　　　　　Page 1 of 1
DATED : December 13, 2005
INVENTOR(S) : Tanmoy Dutta and Jeremy Mazner It is certified that error appears in the above-identified patent and that said Letters Patent is hereby corrected as shown below:

Title page,
Item [54], Title, delete "ABSTRACT" and insert -- ABSTRACTING --.

Signed and Sealed this

Fourteenth Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,976,259 B1  
APPLICATION NO. : 09/677443  
DATED : December 13, 2005  
INVENTOR(S) : Tanmoy Dutta et al.

Page 1 of 1

It is certified that error appears in the above-identified patent and that said Letters Patent is hereby corrected as shown below:

On the Title page, Item (56), under "Other Publications", in column 2, line 1, delete "transitition" and insert -- transition --, therefor.

In column 1, line 1, delete "ABSTRACT" and insert -- ABSTRACTING --, therefor.

In column 4, line 34, delete "(www)" and insert -- (WWW) --, therefor.

In column 6, line 54, delete "Checked Out" and insert -- Checked-Out --, therefor.

In column 7, line 35, delete "TNVOKE" and insert -- INVOKE --, therefor.

In column 10, line 34, in Claim 7, delete "requester" and insert -- requestor --, therefor.

Signed and Sealed this

Third Day of November, 2009

David J. Kappos  
*Director of the United States Patent and Trademark Office*